United States Patent
Unesaki et al.

(10) Patent No.: US 11,567,498 B2
(45) Date of Patent: Jan. 31, 2023

(54) AGRICULTURE SUPPORT DEVICE AND AGRICULTURE SUPPORT SYSTEM

(71) Applicant: KUBOTA CORPORATION, Osaka (JP)

(72) Inventors: Akinori Unesaki, Sakai (JP); Izuru Shimamoto, Sakai (JP); Hirokazu Sasamoto, Sakai (JP); Yoshiharu Yoshimoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 322 days.

(21) Appl. No.: 16/906,087

(22) Filed: Jun. 19, 2020

(65) Prior Publication Data
US 2020/0319649 A1 Oct. 8, 2020

Related U.S. Application Data

(63) Continuation of application No. PCT/JP2018/041816, filed on Nov. 12, 2018.

(30) Foreign Application Priority Data

Jan. 22, 2018 (JP) .............................. JP2018-008280

(51) Int. Cl.
*G05D 1/02* (2020.01)
*A01B 69/04* (2006.01)
(Continued)

(52) U.S. Cl.
CPC ......... *G05D 1/0212* (2013.01); *A01B 69/008* (2013.01); *A01B 76/00* (2013.01);
(Continued)

(58) Field of Classification Search
CPC .. G05D 1/0212; G05D 1/0016; G05D 1/0044; G05D 1/0276; G05D 1/0022; G05D 2201/0201; A01B 69/008; A01B 76/00
(Continued)

(56) References Cited

U.S. PATENT DOCUMENTS

2013/0103269 A1* 4/2013 Meyer Zu Helligen ...................... A01B 69/001
701/50
2016/0169679 A1* 6/2016 Kajino ................... G01C 21/00
701/491
(Continued)

FOREIGN PATENT DOCUMENTS

AU 2015347784 A1 * 6/2017 ............ A01B 69/00
CN 105684587 A 6/2016
(Continued)

OTHER PUBLICATIONS

Official Communication issued in International Patent Application No. PCT/JP2018/041816, dated Feb. 5, 2019.

*Primary Examiner* — Yazan A Soofi
(74) *Attorney, Agent, or Firm* — Keating and Bennett, LLP

(57) ABSTRACT

An agriculture support device includes a traveling creator to create a scheduled traveling route of an agricultural machine in an agricultural field, a display controller to display on an external terminal a virtual traveling status of the agricultural machine to travel on the scheduled traveling route created by the traveling creator, and a correction permitting controller to permit correction of the scheduled traveling route created by the traveling creator when the external terminal requests the correction. The display controller displays, on the external terminal, the virtual traveling status and a result traveling status of the agricultural machine that has traveled on the scheduled traveling route.

12 Claims, 14 Drawing Sheets

(51) Int. Cl.
*A01B 76/00* (2006.01)
*G05D 1/00* (2006.01)
*G06Q 10/06* (2012.01)

(52) U.S. Cl.
CPC ......... *G05D 1/0016* (2013.01); *G05D 1/0044* (2013.01); *G05D 1/0276* (2013.01); *G06Q 10/0633* (2013.01); *G05D 1/0022* (2013.01); *G05D 2201/0201* (2013.01)

(58) Field of Classification Search
USPC .......................................................... 701/2
See application file for complete search history.

(56) References Cited

U.S. PATENT DOCUMENTS

2018/0136664 A1\* 5/2018 Tomita ................. G05D 1/0219
2020/0062266 A1\* 2/2020 Sakaguchi ............. G06Q 50/02
2020/0307693 A1\* 10/2020 Kobayashi ............... B62D 1/04

FOREIGN PATENT DOCUMENTS

| | | |
|---|---|---|
| JP | 2002-074436 A | 3/2002 |
| JP | 2002-181566 A | 6/2002 |
| JP | 2004-295808 A | 10/2004 |
| JP | 2015-194924 A | 11/2015 |
| JP | 2015-224958 A | 12/2015 |
| JP | 2017-055673 A | 3/2017 |
| JP | 2017-060524 A | 3/2017 |
| JP | 2017-127207 A | 7/2017 |
| JP | 2017-127291 A | 7/2017 |
| JP | 2017-134527 A | 8/2017 |
| JP | 2017-168035 A | 9/2017 |
| JP | 2017-173969 A | 9/2017 |
| JP | 2017-173986 A | 9/2017 |
| JP | 2017-204284 A | 11/2017 |
| WO | 2015/119265 A1 | 8/2015 |
| WO | 2016/076319 A1 | 5/2016 |
| WO | 2017/159801 A1 | 9/2017 |

\* cited by examiner

FIG.4

| Management No. | Agro map data | Map |
|---|---|---|
| TK-001 | Yield data | Yield map |
| TK-002 | Taste data | Taste map |
| TK-003 | Growth data | Growth map |
| TK-004 | Soil data | Soil map |
| TK-005 | Variable fertilization data | Variable fertilization map |
| TK-006 | Auto traveling data | Auto traveling map |
| TK-007 | Work history data | Work history map |
| TK-008 | Map data | Whole map |

Fig.9A

| Plan management info. | Work plan | | | |
|---|---|---|---|---|
| | Agricultural work | Agricultural machine Model no. | Work date | ... |
| JYR12550106 | Cultivation | KB-08 | 2017.5.3 | ... |
| JYR13231520 | Ploughing and irrigating | KB-11 | 2017.5.12 | ... |
| . | . | . | . | . |
| . | . | . | . | . |
| . | . | . | . | . |

FIG.9B

| Route management info. | Route information | | Work width | Lapping width |
|---|---|---|---|---|
| | Scheduled traveling route | | | |
| RKE33205771 | Latitude: 34.327 Longitude: 135.646 | ··· | 3.0m | 0.15m |
| RKE37372524 | Latitude: 34.157 Longitude: 136.015 | ··· | 2.5m | 0.10m |
| · | · | · | · | · |
| · | · | · | · | · |
| · | · | · | · | · |

FIG.9C

| Link management info. | Plan management info. | Route management info. |
|---|---|---|
| 005-2723844 | JYR12550106 | RKE33205771 |
| 008-2723845 | JYR13231520 | RKE37372524 |
| ... | ... | ... |

AGRICULTURE SUPPORT DEVICE AND AGRICULTURE SUPPORT SYSTEM

CROSS REFERENCE TO RELATED APPLICATIONS

The present application is a continuation application of International Application No. PCT/JP2018/041816, filed Nov. 12, 2018, which claims the benefit of priority to Japanese Patent Application No. 2018-008280 filed on Jan. 22, 2018. The entire contents of each of these applications are hereby incorporated herein by reference.

BACKGROUND OF THE INVENTION

1. Field of the Invention

The present invention relates to an agriculture support device and to an agriculture support system.

2. Description of Related Art

Japanese Unexamined Patent Publication No. 2017-55673 discloses a technique for creating a target traveling route of an agricultural machine.

The working vehicle support system of Japanese Unexamined Patent Publication No. 2017-55673 includes a vehicle position detector module configured to detect a vehicle position of the working vehicle, an unworked area outline map calculator portion configured to calculate an outline map of an unworked area in the scheduled work area with use of the vehicle position data acquired by the vehicle position detector module in the work traveling around the outline of the scheduled work area, and a route calculator portion configured to calculate the target traveling route for the work traveling in the unworked area based on the outline map calculated by the unworked area outline map calculator portion.

SUMMARY OF THE INVENTION

An agriculture support device includes a traveling creator to create a scheduled traveling route of an agricultural machine in an agricultural field, a display controller to display, on an external terminal, a virtual traveling status of the agricultural machine to travel on the scheduled traveling route created by the traveling creator, and a correction permitting controller to permit correction of the scheduled traveling route created by the traveling creator when the external terminal requests the correction.

An agriculture support system, includes an external terminal, and an agriculture support device including a traveling creator to create a scheduled traveling route of an agricultural machine, a display controller to display, on the external terminal, a virtual traveling status of the agricultural machine to travel on the scheduled traveling route created by the traveling creator, and a correction permitting controller to permit correction of the scheduled traveling route created by the traveling creator when the external terminal requests the correction.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings.

FIG. 4 is a view illustrating a relation between the agriculture map data, an agriculture map, and a management number according to a preferred embodiment of the present invention.

FIG. 9A is a view showing allocation of plan management information to a work plan according to a preferred embodiment of the present invention.

FIG. 9B is a view showing allocation of route management information to route information according to a preferred embodiment of the present invention.

FIG. 9C is a view showing linkage management information relating the plan management information to the route management information according to a preferred embodiment of the present invention.

DETAILED DESCRIPTION OF THE PREFERRED EMBODIMENTS

Figure 1:
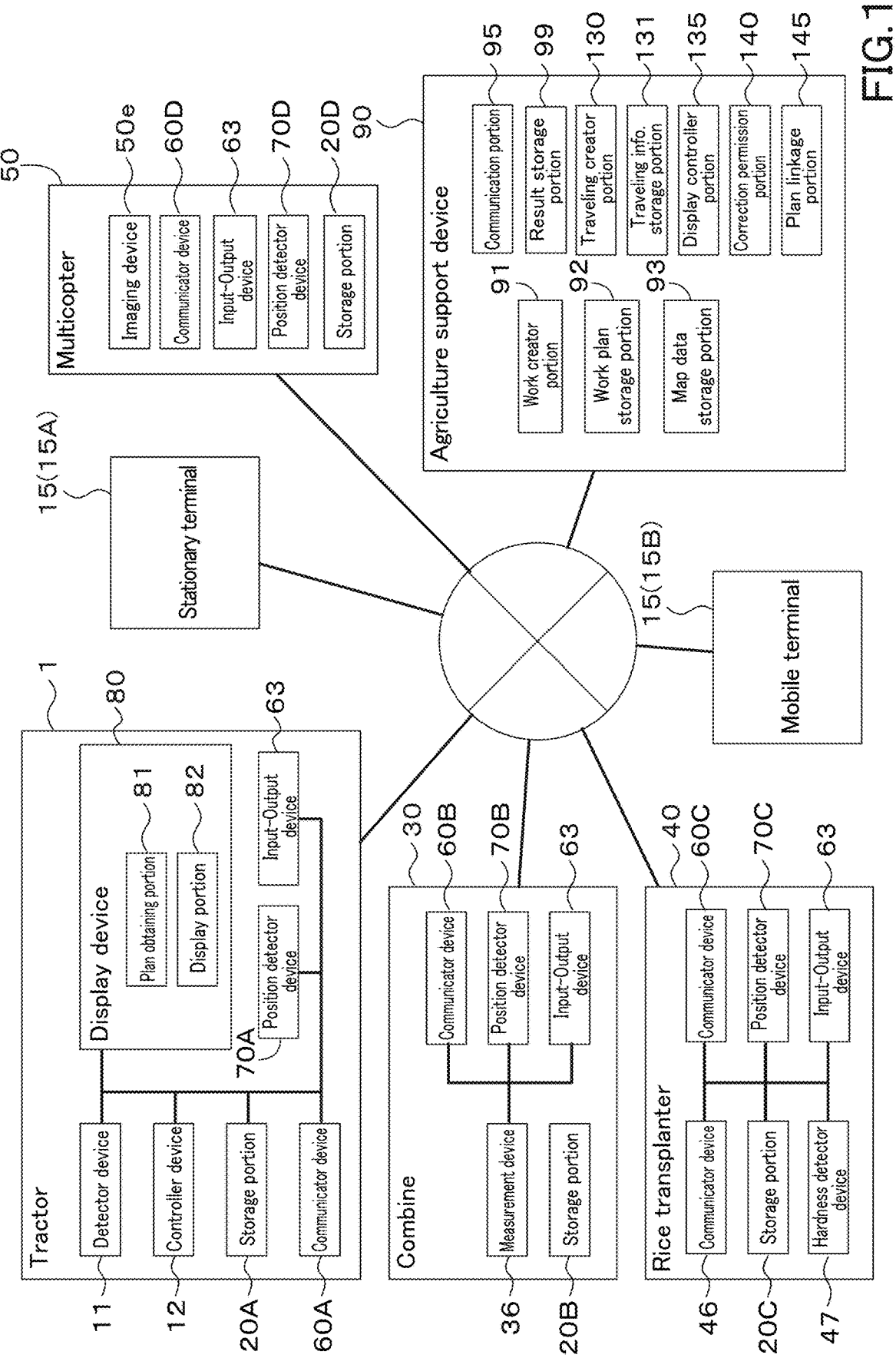
FIG. 1 is a schematic view of an agriculture support system according to a preferred embodiment of the present invention.

The preferred embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with reference to the drawings as appropriate.

The agriculture support system is a system configured to support an agricultural work in an agricultural machine. The agricultural machine is a tractor or a rice transplanter on which the working device 2 such as an implement is attached, a combine for harvesting, or the like. The agricultural machine 1 described above is just an example, and is not limited thereto.

First, the agricultural machine will be described using the tractor 1 as an example.

Figure 2:
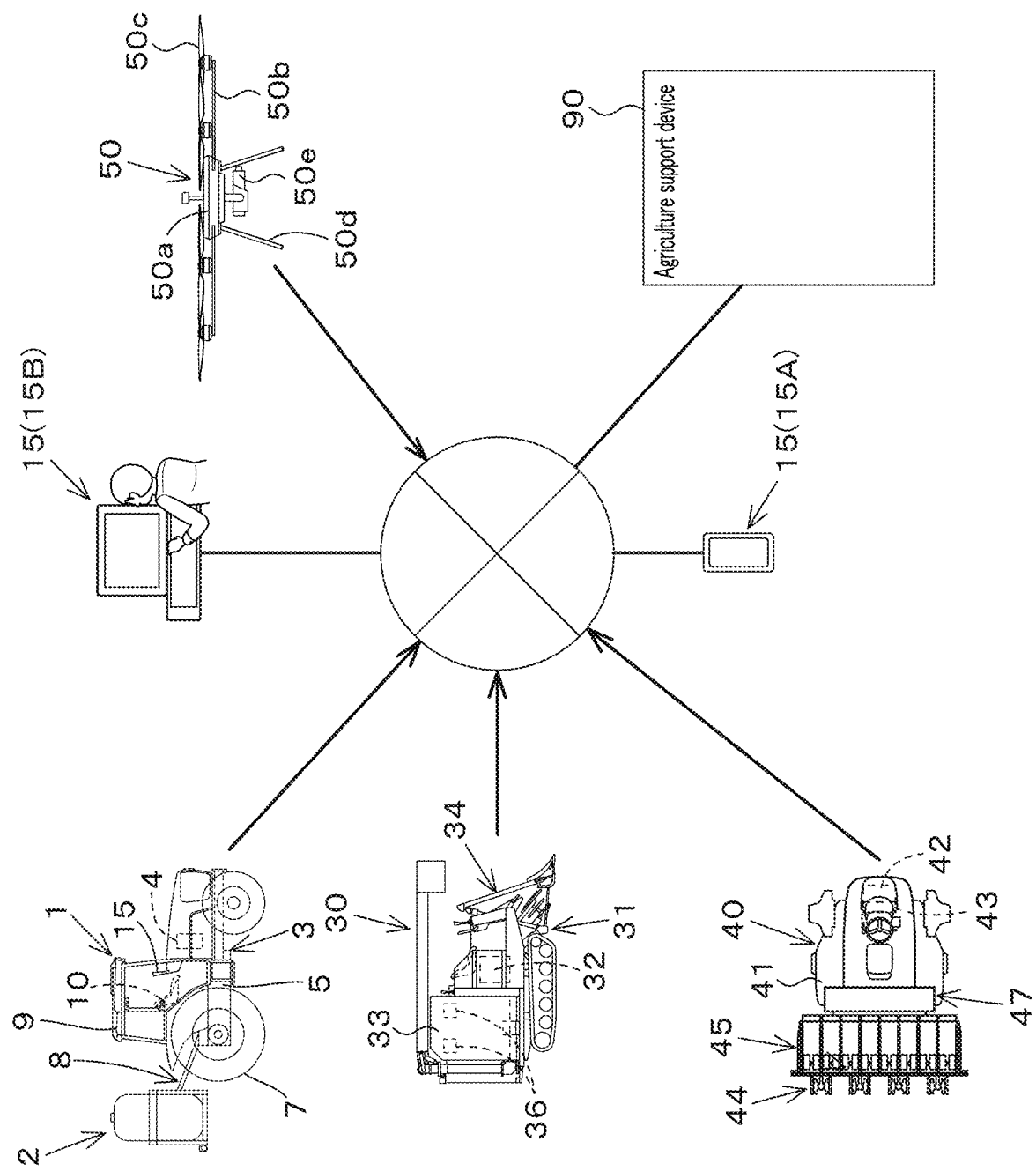
FIG. 2 is a schematic view showing transmission of agriculture map data according to a preferred embodiment of the present invention.
Figure 3:
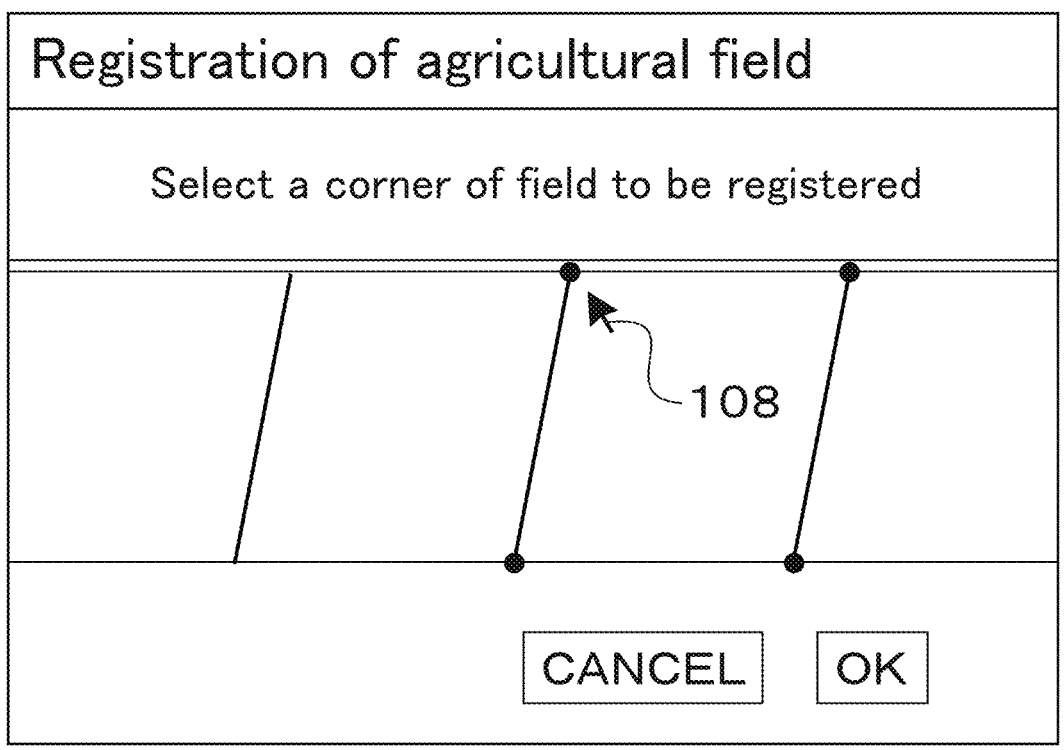
FIG. 3 is a view showing registration of an agricultural field according to a preferred embodiment of the present invention.

As shown in FIG. 2, the tractor 1 includes a traveling vehicle (a traveling vehicle body) 3 including a traveling device 7, a prime mover 4, and a transmission device 5. The traveling device 7 is a tire-type traveling device or a crawler-type traveling device. The prime mover 4 is a diesel engine, an electric motor, or the like. The transmission device 5 is capable of switching the propulsion force of the traveling device 7 through shifting of speeds, and is capable of switching the traveling device 7 between the forward traveling and the reverse traveling. The traveling vehicle 3 is provided with a cabin 9, and an operator seat 10 is provided inside the cabin 9.

In addition, a coupler portion 8 including a three-point link mechanism is provided at a rear portion of the traveling vehicle 3. The working device 2 is configured to be attached to/detached from the coupler portion 8. By coupling the working device 2 to the coupler portion 8, the working device 2 can be towed by the traveling vehicle 3. The working device 2 includes a tiller device for tilling, a fertilizer sprayer device for spraying fertilizer, a pesticide sprayer device for spraying pesticides, a harvester device for harvesting, a mower device for cutting grass and the like, a tedder device for tedding grass and the like, a rake device for raking grass and the like, a baler device for baling grass and the like, and the like.

As shown in FIG. 1, the tractor 1 includes a detector device 11 and a controller device 12. The detector device 11 is configured to detect the state of the tractor 1, and a device including sensors such as an accelerator pedal sensor, a shift lever detector sensor, a crank position sensor, a fuel sensor, a water temperature sensor, an engine revolving sensor, a steering angle sensor, an oil temperature sensor, an axle revolving sensor, an operation extent detector sensor and including switches such as an ignition switch, a parking brake switch, a PTO switch, and an operation switch. The controller device 12 is a device to control the tractor, and is a CPU or the like. The controller device 12 controls the traveling system of the tractor 1 and the working system of the tractor 1 based on the detection values detected by the detector device 11 and the like. For example, the controller device 12 detects the operation extent of the operation tool to move the coupler portion 8 up and down with the operation extent detector sensor, performs the control to move the coupler portion up and down based on the operation extent, and control a revolving speed of the diesel engine based on the operation extent detected by the accelerator pedal sensor. The controller device 12 only needs to control the working system of the tractor 1 and the traveling system of the tractor 1, and the control method is not limited.

The tractor 1 includes a communicator device 60A. The communicator device 60A is a communication module configured to perform either the direct communication or the indirect communication with the agriculture support device 90, and is configured to perform the wireless communication in accordance with the Wi-Fi (Wireless Fidelity, a registered trademark) of the IEEE 802.11 series which is a communication standard, the BLE (Bluetooth (a registered trademark) Low Energy), the LPWA (Low Power, Wide Area), the LPWAN (Low-Power Wide-Area Network), or the like. In addition, the communicator device 60A is capable of performing the wireless communication through a mobile phone communication network or a data communication network, for example.

The tractor 1 includes a position detector device 70A. The position detector device 70A is mounted on a top plate of the cabin 9 of the traveling vehicle 3. The position detector device 70A is mounted on the top plate of the cabin 9. However, the mounting position in the traveling vehicle 3 is not limited thereto, and may be another position. In addition, the position detector device 70A may be attached to the working device 2.

The position detector device 70A is configured to detect its own position (the positioning information that includes latitude and longitude) in accordance with a satellite positioning system. That is, the position detector device 70A receives the signals (the position of positioning satellite, the transmission time, the correction information, and the like) transmitted from the positioning satellite, and then detects the position (latitude and longitude) based on the received signal. The position detector device 70A may detect, as own position (latitude and longitude), a position corrected based on a signal such as a correction transmitted from a ground station (a reference station) capable of receiving a signal transmitted from the positioning satellite. In addition, the position detector device 70A may include an inertial measurement device such as a gyro sensor or an acceleration sensor, and may detect the position corrected by the inertial measurement device as its own position.

The tractor 1 includes a display device 80. The display device 80 is configured to display various types of information, and includes any one of a liquid crystal panel, a touch panel, and other panels. The display device 80 is connected to the detector device 11, the controller device 12, the communicator device 60A, and the position detector device 70A through the in-vehicle network. Any one of the controller device 12, the communicator device 60A, and the display device 80 sequentially stores a detection value detected by the detector device 11, a position (a detected position) detected by the position detector device 70A, information relating to the work transmitted from the working device 2, and the like at least under the state where the tractor 1 is operating, and the sequentially-stored information is stored as work results.

The agriculture support system is configured to create a work plan of the agricultural work to be performed by the agricultural machine by the agriculture support device 90 or the like shown in FIG. 1. In creating the work plan and a scheduled traveling route, the work plan can be created while displaying a plurality of agricultural maps. The agriculture support device 90 includes, for example, a server installed in a farm house, a farming office, an agricultural machine maker, an agricultural service office, or the like.

First, a type, acquisition, and the like of the agricultural map data that is the source data of the agricultural map will be described in detail.

The agricultural map data is data in which data relating to agriculture and positions are associated with each other, and includes field shape data, yield data, taste data, growth data, soil data, variable fertilization data, automatic traveling data, work history data, map data, and the like.

The field shape data is data representing a shape of the agricultural field. The yield data is data representing the crop yield, and the taste data is data representing the protein content of the crop. The growth data is data representing the growth of the crop, and is data obtained from vegetation indexes such as DVI, RVI, NDVI, GNDVI, SAVI, TSAVI, CAI, MTCI, REP, PRI, and RSI. The soil data is data representing the components of the soil, the hardness of the soil, and the like. The variable fertilization data is data representing the amount of fertilization when fertilization is performed. The automatic traveling data is data representing the scheduled traveling route. The work history data is data representing an actual travel locus when the tractor 1 or the like travels according to the scheduled traveling route. The map data is data obtained from the Geospatial Information Authority of Japan or from a map provider that provides maps. These agricultural map data can be obtained by various machines.

Next, the agricultural map data will be described below.

The field shape data can be acquired by the agriculture support device 90 and the external terminal 15. The external terminal 15 is a personal computer, a smartphone, a tablet computer, a PDA, or the like. The external terminal 15 is divided into a stationary terminal (a fixed terminal) 15A of a personal computer and a mobile terminal (a portable terminal) 15B of a smartphone, a tablet computer, and a PDA. For convenience of the explanation, the fixed terminal 15A and the portable terminal 15B are properly used to distinguish the external terminal 15.

In particular, when an administrator or the like connects the external terminal 15 to the agriculture support device 90, the agriculture support device 90 acquires a map including an agricultural field from a map provider or the like, and causes the external terminal 15 to display the map. As shown in FIG. 4, the administrator or the like specifies, for example, an own agricultural field from the maps displayed on the external terminal 15 with the pointer 108 or the like, and then specifies the outline of the specified agricultural field with the pointer 108. In this manner, the field shape data can be acquired. The position obtained when the agricultural machine such as the tractor travels along the shore of the agricultural field or the like may be detected by the position detector device 70A, and the position detected above may be used as the field shape data.

The automatic traveling data can be acquired by the agriculture support device 90. In particular, when the work creator portion 91 creates the scheduled traveling route as described above, the automatic travel data can be acquired by setting the created scheduled traveling route as the automatic travel data. That is, the agriculture support device 90 can acquire the automatic traveling data by incorporating the scheduled traveling route created by the work creator portion 91 as one of the agricultural map data.

The yield data and the taste data can be acquired by the combine 30. As shown in FIG. 1 and FIG. 2, the combine 30 includes a vehicle body 31, a prime mover 32, a grain tank 33, a reaper device 34, a threshing device (not shown in the drawings), and a measuring device 36. The prime mover 32, the grain tank 33 and the threshing device are provided on the vehicle body 31. The reaper device 34 is provided at a front portion of the vehicle body 31. The reaper device 34 is configured to reap cereals. The threshing device is configured to thresh the reaped cereals. The grain tank 33 is a tank configured to store the threshed cereals.

The measuring device 36 is a spectroscopic analyzer that measures the water content and the protein content of the harvested crops. Thus, the measuring device 36 can detect the crop yield, the moisture rate (the moisture content), and the protein rate (the protein content) of the crop.

The vehicle body 31 is provided with a position detector device 70B. The position detector device 70B is configured to detect a position (latitude and longitude), and has the same configuration as the position detector device 70A, and thus the description thereof will be omitted.

The combine 30 includes a storage portion 20B defined by a nonvolatile memory or the like. When the harvesting operation is performed by the combine 30, the storage portion 20B is capable of storing the yield data that associates the crop yield with the position detected by the position detector device 70B, and is capable of storing the protein content and the position detection. Taste data can be stored by associating the protein rate with the position detected by the position detector device 70B.

The growth data can be acquired by the multicopter 50 or the like. As shown in FIG. 1 and FIG. 2, the multicopter 50 includes a body 50a, an arm 50b provided on the body 50a, a rotary wing 50c provided on the arm 50b, and a skid 50d provided on the body 50a. The rotary wing 50c is configured to generate a lifting force for flying, and includes a rotor that provides a rotary force and a blade (a propeller) that rotates by the rotary force of the rotor. In addition, the multicopter 50 includes an imaging device 50e. The imaging device 50e includes an infrared camera or the like, and is a device capable of shooting crops in an agricultural field.

In addition, the multicopter 50 includes a position detector device 70D. The position detector device 70D is configured to detect a position (latitude and longitude), and has the same configuration as that of the position detector device 70A, and thus the description thereof will be omitted.

The multicopter 50 flies over the agricultural field, aerially captures the crops on the agricultural field, and then associates the image captured by the imaging device 50e (the captured image) with the position detected by the position detector device 70D to obtain the image data. The image data is stored in the storage portion 20D provided in the multicopter 50. The image data is analyzed to be converted into a vegetation index. The storage portion 20D includes a nonvolatile memory or the like.

Thus, by flying the multicopter 50 over the agricultural field, the pre-conversion growth data in which original imaging data that is original data representing growth of crops is related to the position detected by the position detector device 70D can be obtained. The image data of the pre-conversion growth data is converted into the vegetation index with a computer or the like (not shown in the drawings) to create the growth data.

The rice transplanter 40 is capable of acquiring the soil data and the variable fertilization data. As shown in FIG. 1 and FIG. 2, the rice transplanter 40 includes a vehicle body 41, a prime mover 42, a transmission device 43, and a seedling planting device 44. The prime mover 42 and the transmission device 43 are provided on the vehicle body 41. The seedling planting device 44 is provided at a rear portion of the vehicle body 41. The seedling planting device 44 takes out, from the seedling stage 45, the seedlings mounted on the seedling stage 45 provided at the rear portion of the vehicle body 41, and plants them in an agricultural field or the like.

The working device 2 such as a fertilizer configured to perform the variable fertilization or the like can be attached to the rear portion of the vehicle body 41. In addition, the vehicle body 41 is provided with a position detector device 70C. The position detector device 70C is configured to detect a position (latitude and longitude), and has the same configuration as that of the position detector device 70A, and thus the description thereof will be omitted.

The rice transplanter 40 includes a storage portion 20C. When the rice transplanter 40 performs the rice transplanting operation, the storage portion 20C associates the fertilization amount performed by the fertilizer with the position detected by the position detector device 70C, and thereby acquires and stores the variable fertilization data.

The rice transplanter 40 includes a hardness detector device 47 configured to detect the hardness of the soil. The hardness detector device 47 detects the hardness of the soil based on the ups and downs (vertical fluctuation) of the vehicle body 41 when the rice transplanter 40 performs the rice transplanting operation. When the rice transplanter 40 performs the rice transplanting operation, the storage portion 20C associates the hardness detected by the hardness detector device 47 with the position detected by the position detector device 70C, and thereby obtains and stores the soil data.

The work history data can be acquired by the tractor 1. Note that the automatic traveling data and the work history data can be acquired respectively by each of the combine 30 and the rice transplanter 40, when replacing the tractor 1 with the combine 30 and the rice transplanter 40.

The tractor 1 is configured to acquire the scheduled traveling route created by the agriculture support device 90 or the like. When the tractor 1 is in a mode for the automatic traveling, the tractor 1 travels while automatically steering the steering or the like along the scheduled traveling route acquired above. The storage portion 20A stores the position detected by the position detector device 70A when the tractor 1 performs the automatic traveling. That is, the work operation history data can be acquired by storing, to the storage portion 20A, the position of the tractor 1 as the traveling locus when the tractor 1 travels based on the scheduled traveling route.

When the tractor 1, the combine 30, the rice transplanter 40, and the multicopter 50 are respectively provided with the communicator devices 60A, 60B, 60C, and 60D, the agricultural map data is transmitted to the agriculture support device 90 with use of the communicator devices 60A, 60B, 60C, and 60D.

The communicator devices 60A, 60B, 60C, and 60D are communication modules configured to perform either the direct communication or the indirect communication with the agriculture support device 90, and configured to perform the wireless communication in accordance with the Wi-Fi (Wireless Fidelity, a registered trademark) of the IEEE 802.11 series which is a communication standard, the BLE (Bluetooth (a registered trademark) Low Energy), the LPWA (Low Power, Wide Area), the LPWAN (Low-Power Wide-Area Network), or the like, for example. In addition, the communicator devices 60A, 60B, 60C, and 60D is capable of performing the wireless communication through a mobile phone communication network or a data communication network, for example.

In the direct communication, the agriculture support device 90 requests the communicator devices 60A, 60B, 60C, and 60D to transmit agricultural map data regularly or irregularly. When the communicator devices 60A, 60B, 60C, and 60D receive the request for transmission of the agricultural map data, the tractor 1, the combine 30, the rice transplanter 40, and the multicopter 50 transmit the agricultural map data stored in the storage portions 20A, 20B, 20C, and 20D to the agriculture support device 90 through the communicator devices 60A, 60B, 60C, and 60D, in response to the request. Alternatively, in the direct communication, the agricultural map data of the storage portions 20A, 20B, 20C, and 20D are transmitted, to the agriculture support device 90, from the communicator devices 60A, 60B, 60C, and 60D provided in the tractor 1, the combiner 30, the rice transplanter 40, and the multicopter 50.

In the direct communication, when the agriculture support device 90 receives the image data that is the source of the growth data, the agriculture support device 90 may convert the image data into the growth data.

In the indirect communication, the communicator devices 60A, 60B, 60C, and 60D periodically or irregularly transmit, to the terminal 15B, the agricultural map data stored in the storage portions 20A, 20B, 20C, and 20D. Upon receiving the agricultural map data, the terminal 15B stores (saves) the agricultural map data that is temporarily received. The agriculture support device 90 requests the terminal 15B to transmit the agricultural map data regularly or irregularly. When the terminal 15B receives the request for transmission of the agricultural map data, the terminal 15B transmits the agricultural map data, which is temporarily stored, to the agriculture support device 90. Alternatively, in the indirect communication, the agricultural map data is transmitted from the terminal 15B to the agriculture support device 90. In the indirect communication, when the terminal 15B receives the image data that is the source of the growth data, the terminal 15B may convert the image data into the growth data. Alternatively, similarly to the direct communication, the agriculture support device 90 may convert the image data into the growth data after the agriculture support device 90 receives the image data.

Each of the tractor 1, the combine 30, the rice transplanter 40, and the multicopter 50 is provided with an input/output device 63 to which a storage medium such as a USB memory or an SD card, which is an electronic storage medium, can be connected when the communicator devices 60A, 60B, 60C, and 60D are not provided in the tractor 1, the combine 30, the rice transplanter 40, and the multicopter 50. The input/output device 63 is provided in the controller devices, the display devices, and the like of the tractor 1, the combine 30, the rice transplanter 40, the multicopter 50, and is capable of writing data to a storage medium and acquiring information of the storage medium. When the input/output device 63 is connected to the storage medium, the agricultural map data stored in the storage portions 20A, 20B, 20C, and 20D is transferred to the storage medium. The storage medium is capable of being connected to the terminals 15A and 15B. When the storage medium is connected to the terminals 15A and 15B, the agricultural map data stored in the storage medium is transferred to the terminals 15A and 15B. The terminal 15A and the terminal 15B transmit the agricultural map data to the agriculture support device 90. In the case where the storage medium is used, the terminals 15A and 15B may convert the image data into growth data when the terminals 15A and 15B receive the image data.

Alternatively, similarly to the direct communication, the agriculture support device 90 may convert the image data into growth data after the agriculture support device 90 receives the image data.

Figure 5:
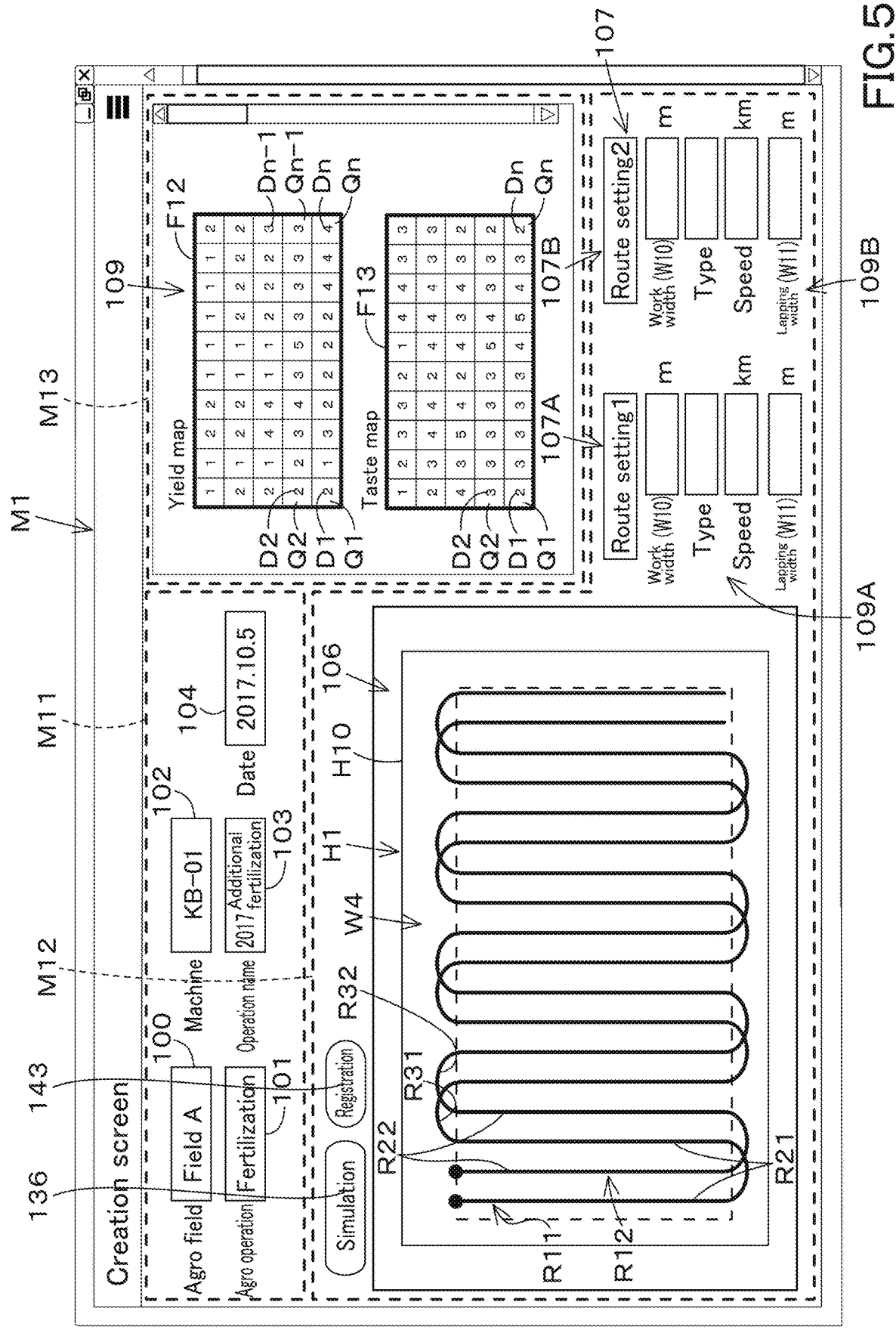
FIG. 5 is a view illustrating an example of a creating screen M1 according to a preferred embodiment of the present invention.

As shown in FIG. 1, the agriculture support device 90 includes a map data storage portion 93. The map data storage portion 93 includes a nonvolatile memory or the like, and stores the acquired agricultural map data (the field shape data, the yield data, the taste data, the growth data, the soil data, the variable fertilization data, the automatic traveling data, the work history data, the map data). Specifically, as shown in FIG. 5, when the agriculture support device 90 acquires the agricultural map data, the map data storage portion 93 allocates the management information indicated by characters, alphanumeric characters, and the like in the agricultural map data acquired above, and the agricultural map data is stored together with the management information. The management information is information set to make it easy to calculate, search, organize, and the like of the agricultural map data.

Thus, the agriculture support device 90 is configured to acquire and store various types of agricultural map data.

As shown in FIG. 1, the agriculture support device 90 includes a work creator portion 91, a storage portion (a work plan storage portion) 92, a traveling creator portion 130, and a storage portion (a traveling information storage portion) 131.

The work creator portion 91 and the traveling creator portion 130 include electric and electronic components provided in the agriculture support device 90, computer programs stored in the agriculture support device 90, or the like. The work plan storage portion 92 and the traveling information storage portion 131 include a nonvolatile memory or the like.

The work creator portion 91 creates a work plan for agricultural work to be performed by an agriculture machine such as the tractor 1. The work plan is information indicating contents in which an agricultural field, an agricultural work, and a work date are associated with each other. The agricultural work is, for example, seedbed soil making, ridge plastering, tilling, seeding, fertilizing, rice planting, ploughing and irrigating, grooving, weeding, topdressing, harvesting, and the like.

As shown in FIG. 5, when the external terminal 15 is connected to the agriculture support device 90 and the external terminal 15 requests to create a work plan, the work creator portion 91 and the traveling creator portion 130 display a creating screen M1 on the external terminal 15 in response to the request.

The creating screen M1 is divided into a work creating area M11 for creating a work plan, a route creating area M12 for setting a scheduled traveling route, and a map displaying area M13 for displaying an agricultural map.

In the work creating area M11, a field inputting portion 100 for inputting an agricultural field where a farm work is performed, a work inputting portion 101 for inputting a farm work, a machine inputting portion 102 for inputting a machine, a name inputting portion 103 for inputting a name of work, and a time inputting portion 104 for inputting time are displayed. The field inputting portion 100 inputs information for specifying an agricultural field, for example, a field name, a field management number, and the like. The work inputting portion 101 inputs an agricultural work such as seedbed soil making, ridge plastering, tilling, seeding, fertilizing, rice planting, ploughing and irrigating, grooving, weeding, topdressing, harvesting, and the like. The model number, model, name and the like of the agricultural machine can be inputted to the machine inputting portion 102. For example, the model number, model, name and the like of the working device 2 connected to the tractor 1 and the like are inputted. The name inputting portion 103 inputs an arbitrary name for the operator or the like to identify the machine. To the time inputting portion 104, a work date, a work time, and the like for performing the agricultural work are inputted.

Thus, the work creator portion 91 is capable of creating, as a work plan, the model number, model, name, work date, and the like of the agricultural work and the agricultural machine (the working device).

In the route creating area M12, a field (a route input unit) 106 for inputting a scheduled traveling route of the agricultural machine and a detail setting portion 107 are displayed. A position information (latitude and longitude) of an agricultural field is assigned to the field 106, a scheduled traveling route is drawn based on an instruction from the external terminal 15, and thereby the position information (latitude and longitude) is assigned to the scheduled traveling route. In particular, the field 106 displays an contour H10 of an agricultural field (a target work field) H1 in which a work is performed. The contour H10 is determined based on a position (a detected position) detected by the position detector device 70A includes in the tractor 1 that travels around the outer periphery of the target work field H1. A turning area is assigned to an area W4 separating by a predetermined distance from the contour H10 of the field 106. The setting of the contour H10 is not limited to the example described above.

The detail setting portion 107 displays a first setting button 107A and a second setting button 107B for inputting a condition for creating a scheduled traveling route. When the first setting button 107A is selected, a first inputting portion 109A for inputting a condition for creating the scheduled traveling route R11 in a first tractor 1 is displayed. When the second setting button 107B is selected, a second inputting portion 109B for inputting a condition for creating the scheduled traveling route R12 in the second tractor 1 is displayed. Here, when the condition is inputted to the first inputting portion 109A and the second inputting portion 109B, the traveling creator portion 130 creates two of the scheduled traveling routes R11 and R12 for two of the tractors 1 on the field 106. That is, the traveling creator portion 130 is capable of creating the scheduled traveling routes R11 and R12 in a cooperative traveling system in which the first tractor 1 and the second tractor 1 travel in coordinated manner. Hereinafter, for convenience of the description, the scheduled traveling route R11 may be referred to as a "first scheduled route R11", and the scheduled traveling route R12 may be referred to as a "second scheduled route R12".

The traveling creator portion 130 creates in the field 106 a straight traveling portion R21 that causes the tractor 1 to travel straight and creates a turning portion R31 that turns the tractor 1 as a first scheduled route R11 through an operation from the external terminal 15, for example. In addition, as the second scheduled route R12, a straight traveling portion R22 that causes the tractor 1 to travel straight and a turning portion R32 that turns the tractor 1 are created. In creating the first scheduled route R11 and the second scheduled route R12 in the same field 106, the traveling creator portion 130 alternately arranges the straight traveling portions R21 and the straight traveling portions R22, and alternately arranges the turning portion R31 and the turning portion R32.

The straight portions R21 and R22 and the turning portions R31 and R32 in the traveling routes R11 and R12 are associated with the positions (latitude and longitude) of the field 106, and the traveling creator portion 130 assigns the positions (latitude and longitude) of the field 106 to at least the straight traveling portions R21 and R22 and the turning portions R31 and R32.

The traveling information such as the work width W10 of the working device 2 mounted on the first tractor 1 and the model number, model, name, vehicle speed, and set inter-vehicle distance of the working device 2 can be inputted to the first inputting portion 109A. The traveling information such as the work width W10 of the working device 2 mounted on the second tractor 1 and the model number, model, name, vehicle speed, and set inter-vehicle distance of the working device 2 can be inputted to the second inputting portion 109B. The traveling information mentioned above is just an example, and is not limited thereto. In addition, the first inputting portion 109A and the second inputting portion 109B input a lapping width W11 at which the working devices 2 overlap in adjacent works. When the lapping width W11 is inputted, the distance between the adjacent straight traveling portions R21 and R22 is set to a difference between the work widths W10 and W11.

Thus, the first scheduled route R11 and the second scheduled route R12 can be created by the traveling creator portion 130. The positions (latitude and longitude) and the like corresponding to the first scheduled route R11 and the second scheduled route R12 created by the traveling creator portion 130 are stored in the traveling information storage portion 131.

Figure 6:
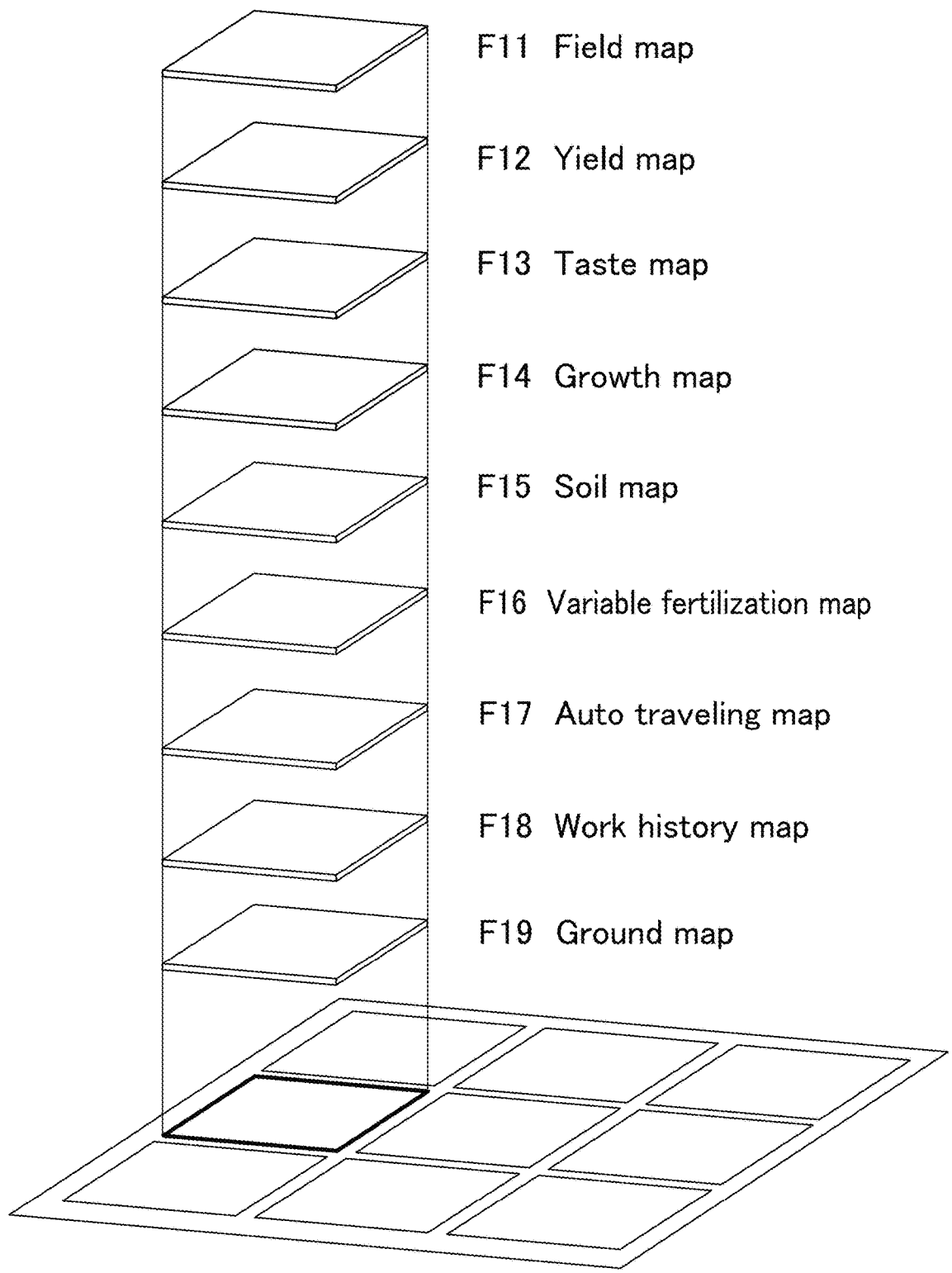
FIG. 6 is a view illustrating an image of an agriculture map according to a preferred embodiment of the present invention.

The map displaying area M13 displays an agricultural field map F11 visualizing the field shape data shown in FIG. 6, a yield map F12 visualizing the yield data, a taste map F13 visualizing the taste data, a growth map F14 visualizing the growth data, a soil map F15 visualizing the soil data, a variable fertilization map F16 visualizing the variable fertilization data, an automatic travel map F17 visualizing the automatic travel data, a work history map F18 visualizing the work history data, and a ground map F19 visualizing the map data.

For example, as shown in FIG. 5, the agriculture support device 90 refers to the map data storage portion 93, and the agricultural map data stored in the map data storage portion 93, which needs to be converted into a map, is converted to an agricultural map, and the agricultural map converted above is displayed in the map displaying area M13 (the map display portion 109). For example, the agricultural support device 90 converts the agricultural map data into an agricultural map for the yield data, the taste data, the growth data, the soil data, and the variable fertilization data.

For example, the agricultural support device 90 refers to data such as numerical values and the position (latitude and longitude) in the agricultural map data (the yield data, the taste data, the growth data, the soil data, the variable fertilization data). On the other hand, the agricultural support device 90 sections the field of the map displaying area M13 into a plurality of areas Qn (n=1, 2, 3, . . . , N), and sets, as a representative value Dn (n=1, 2, 3, . . . , N), an average value obtained by averaging a plural pieces of data Qn [i] (n: section, Qn [i]: data, i: number of data) to be entered to each of the sectioned areas Qn in the agricultural map data. Alternatively, the map displaying area M13 sets, as the representative value Dn, an integrated value obtained by integrating a plural pieces of data Qn [i] included in each of the sectioned areas Qn in the agricultural map data. Alternatively, the agricultural support device 90 sets, as the representative value Dn, a numerical value per area obtained by dividing the average value and the integrated value by an area of the area Qn.

After obtaining the representative value Dn, the agricultural support device 90 assigns one of a plurality of groups (a plurality of ranks) according to the magnitude (a value) of the representative value Dn, and changes the color or the like for each of the ranks, thereby displaying the agricultural map. That is, in the map displaying area M13, a field indicating an agricultural field or the like is divided into a plurality of sections, and a mesh-type agricultural map in which agricultural map data is assigned to the area Qn is displayed. In addition, in the preferred embodiment described above, the example in which the agricultural map is visualized by the mesh type map is described. However, the visualized map of the agricultural map is not limited to the example described above.

When a plural pieces of agricultural map data are stored in the map data storage portion 93, a plurality of agricultural maps are displayed in the map displaying area M13 in a longitudinally or laterally arranged manner. In displaying the agricultural map in the map displaying area M13, the agriculture support device 90 preferably displays, around the agricultural map, basic map information such as the name of the agricultural map and the acquisition date of the agricultural map data.

The basic information (name, acquisition date, and the like) of the agricultural map is associated to each of the agricultural map data (the management information) by connecting any one of the terminal 15A and the terminal 15B to the agricultural support device 90 and by inputting the basic information. Note that the basic information may be automatically generated and associated with the management information, and then the basic information may be stored in the map data storage portion 93. Thus, the inputting method and the method of association are not limited thereto.

Thus, since various types of agricultural maps (F11 to F19) are displayed in the map displaying area M13, the administrator or the like is capable of setting the work plan such as an item of the agricultural work and a work date, and setting the first scheduled route R11, the second scheduled route R12, and the like.

Although a plurality of agricultural maps (F11 to F18) are displayed in the map displaying area M13, a predetermined agricultural map related to the work plan to be set on the creating screen M1 among the plurality of agricultural maps may be displayed in the map displaying area M13. The agricultural support device determines an agricultural map to be displayed in the map displaying area M13 according to an item of the agricultural work inputted to the work inputting portion 101 from among a plurality of agricultural maps, for example. When the agricultural work is the fertilization, the agriculture support device 90 displays an agriculture map (the variable fertilization map F16) relating to the fertilization in the map displaying area M13.

Thus, since the agriculture support device 90 causes the external terminal 15 display the predetermined agricultural map related to the creation of the work plan among the plurality of agricultural maps, the administrator or the like is capable of creating the plan while watching an item of the agricultural work to be set in the creating screen M1 or the agricultural map based on the first scheduled route R11 and the second scheduled route R12.

Now, the agriculture support device 90 can perform a simulation of a case where an agricultural machine such as the tractor 1 travels on each of the first scheduled route R11 and the second scheduled route R12.

The agriculture support device 90 includes a display controller portion 135. The display controller portion 135 includes electric and electronic components provided in the agriculture support device 90, computer programs stored in the agriculture support device 90, or the like. The display controller portion 135 causes the external terminal 15 to display a virtual traveling state where the tractor 1 travels on each of the first scheduled route R11 and the second scheduled route R12 set by the traveling creator portion 130.

Figure 7:
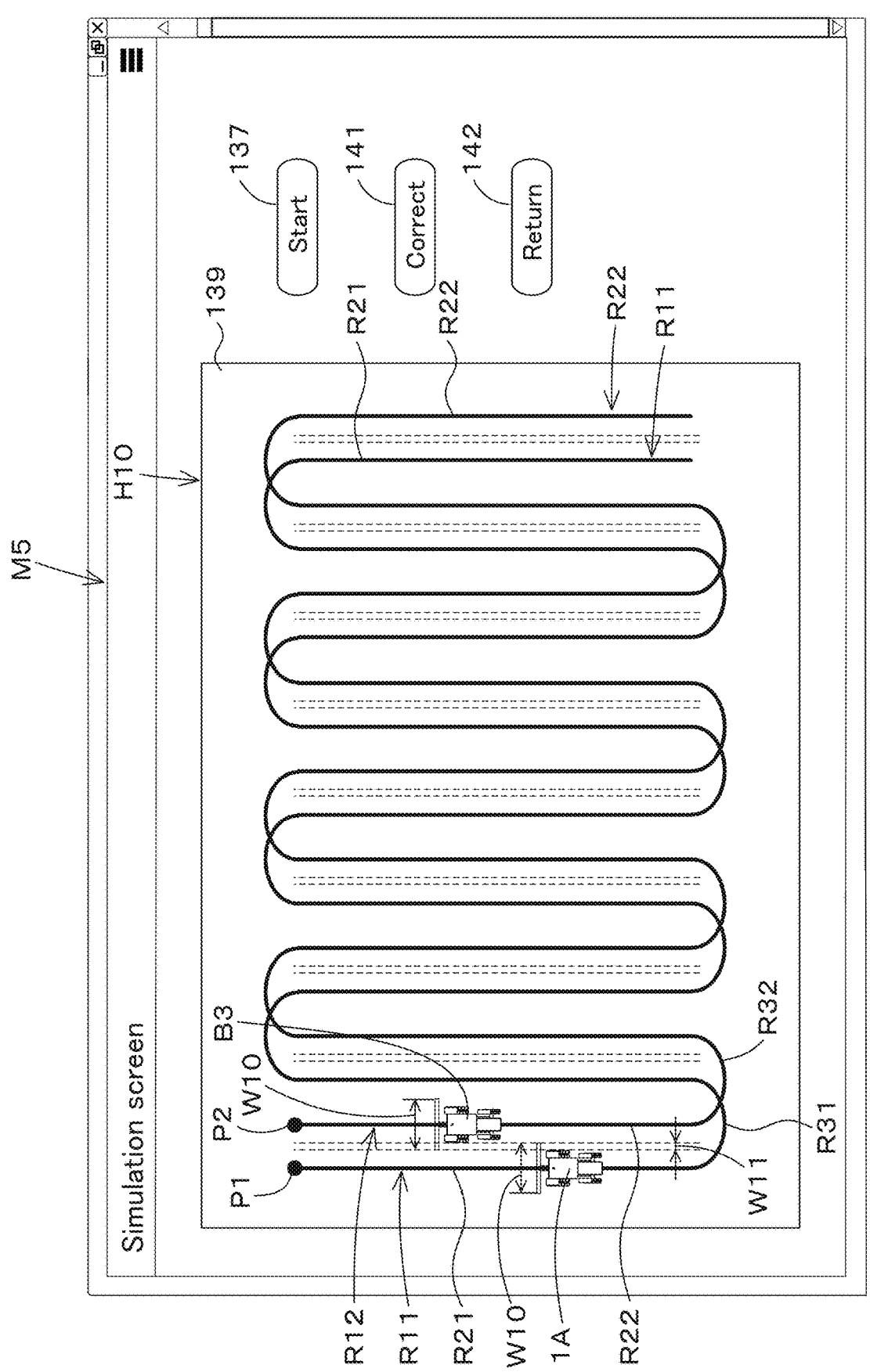
FIG. 7 is a view illustrating an example of a simulation screen M5 according to a preferred embodiment of the present invention.

As shown in FIG. 5, when the simulation button 136 shown on the creating screen M1 is selected after setting the first scheduled route R11 and the second scheduled route R12 in the route creating area M12, the display controller portion 135 displays the simulation screen M5 on the external terminal 15 as shown in FIG. 7. The display controller portion 135 displays the contour H10 of the agricultural field on the field 139 of the simulation screen M5, and also displays the first scheduled route R11 and the second scheduled route R12 set for the agricultural field in two dimensions.

In addition, the display controller portion 135 displays, on the simulation screen M5, the first virtual traveling body 1A including the tractor 1 and the working device 2 traveling on the first scheduled route R11 and the second virtual traveling body 1B including the tractor 1 and the working device 2 traveling on the second scheduled route R12. The display controller portion 135 displays, on the simulation screen M5, the traveling information and other information used when the first scheduled route R11 and the second scheduled route R12 are set.

When the start button 137 shown on the simulation screen M5 is selected, the movement of the first virtual traveling body 1A starts from the work start position P1 preliminarily set, and the movement of the second virtual traveling body B starts from the work start position P2 preliminarily set. As the virtual traveling state, the display controller portion 135 displays, in the simulation screen M5, a transition in which the first virtual traveling body 1A and the second virtual traveling body 1B respectively travel on the first scheduled route R11 and the second scheduled route R12. The movement speeds of the first virtual traveling body 1A and the second virtual traveling body 1B are speeds corresponding to the vehicle speeds indicated in the traveling information. In addition, in order to maintain a predetermined inter-vehicle distance with respect to the first virtual traveling body 1A, the second virtual traveling body 1B starts to travel on the work start position P2 after the first virtual traveling body 1A travels in a predetermined inter-vehicle distance. The setting of the predetermined inter-vehicle distance is performed by at least one of the first inputting portion 109A and the second inputting portion 109B.

That is, on the simulation screen M5, after the start button 137 is selected, a simulation in which the first virtual traveling body 1A and the second virtual traveling body 1B respectively travel on the first scheduled route R11 and the second scheduled route R12 can be performed. In the present preferred embodiment, it is possible to confirm the virtual traveling state where the first agricultural machine that is an agricultural machine such as a tractor traveling on the first scheduled route R11 and the second agricultural machine that is an agricultural machine such as a tractor traveling on the second scheduled route R12 travel in coordinated manner.

Note that the display controller portion 135 differs the color of position on which the first virtual traveling body 1A has already traveled from the color of position on which the first virtual traveling body 1A has not traveled yet on the field 139 in which the contour H10 of the agricultural field, the first scheduled route R11, and the second scheduled route R12 are displayed, thereby facilitating confirmation of the virtual traveling state. Similarly, the display controller portion 135 differs the color of position on which the second virtual traveling body 1B has already traveled from the color of position on which the second virtual traveling body 1B has not traveled yet on the field 139, thereby facilitating confirmation of the virtual traveling state.

As described above, the display controller portion 135 causes the external terminal 15 to display the virtual traveling states when the tractors 1 have traveled on each of the first scheduled route R11 and the second scheduled route R12, and thereby it is possible to confirm whether or not the tractors 1 can travel according to the traveling plan.

Figure 12:
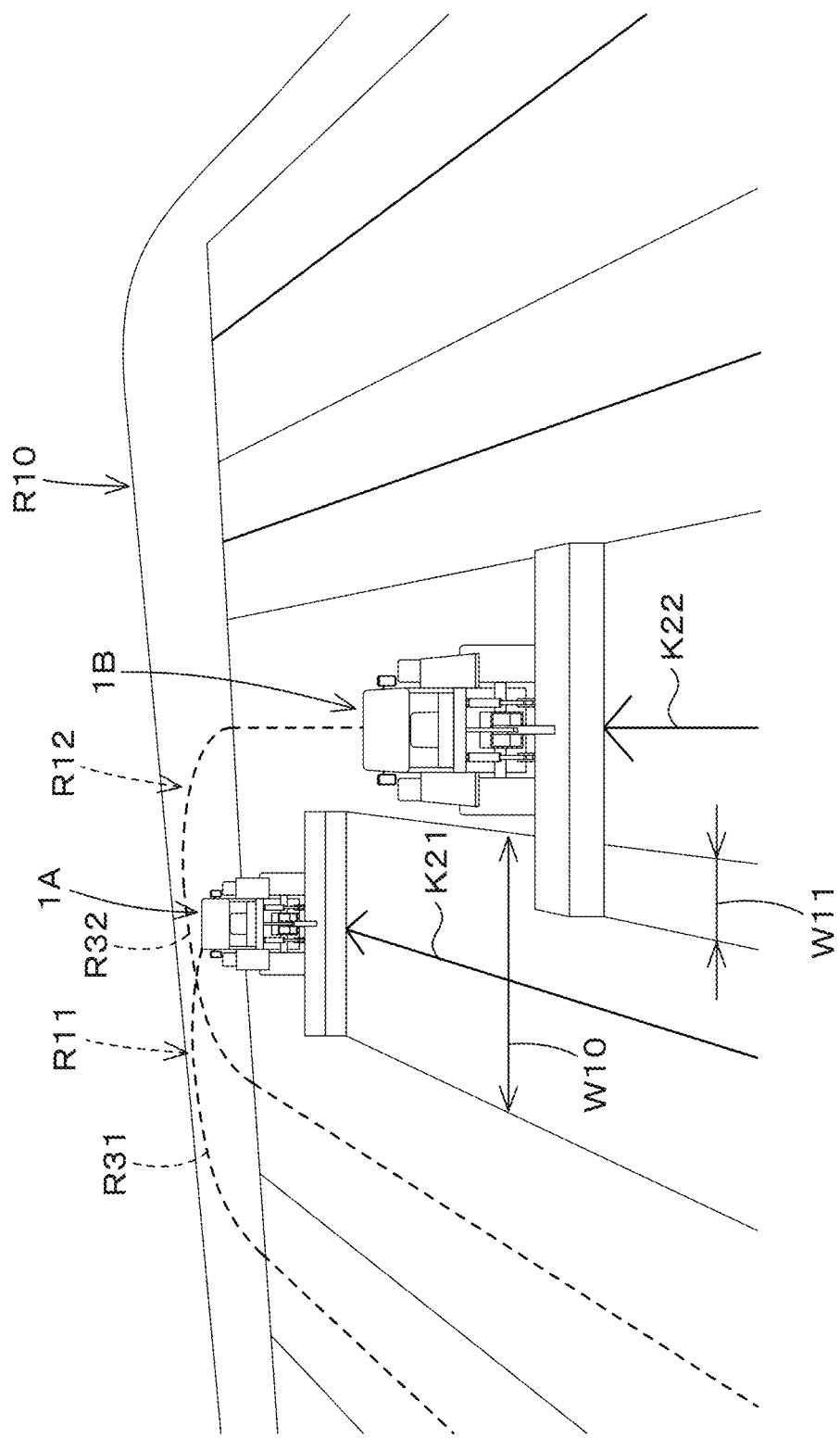
FIG. 12 is a view illustrating a traveling status in three dimensions according to a preferred embodiment of the present invention.

In the preferred embodiment mentioned above, the virtual traveling state of the tractor 1 is shown in a two-dimensional plan view, but may be shown in a three-dimensional manner as shown in FIG. 12.

Figure 8:
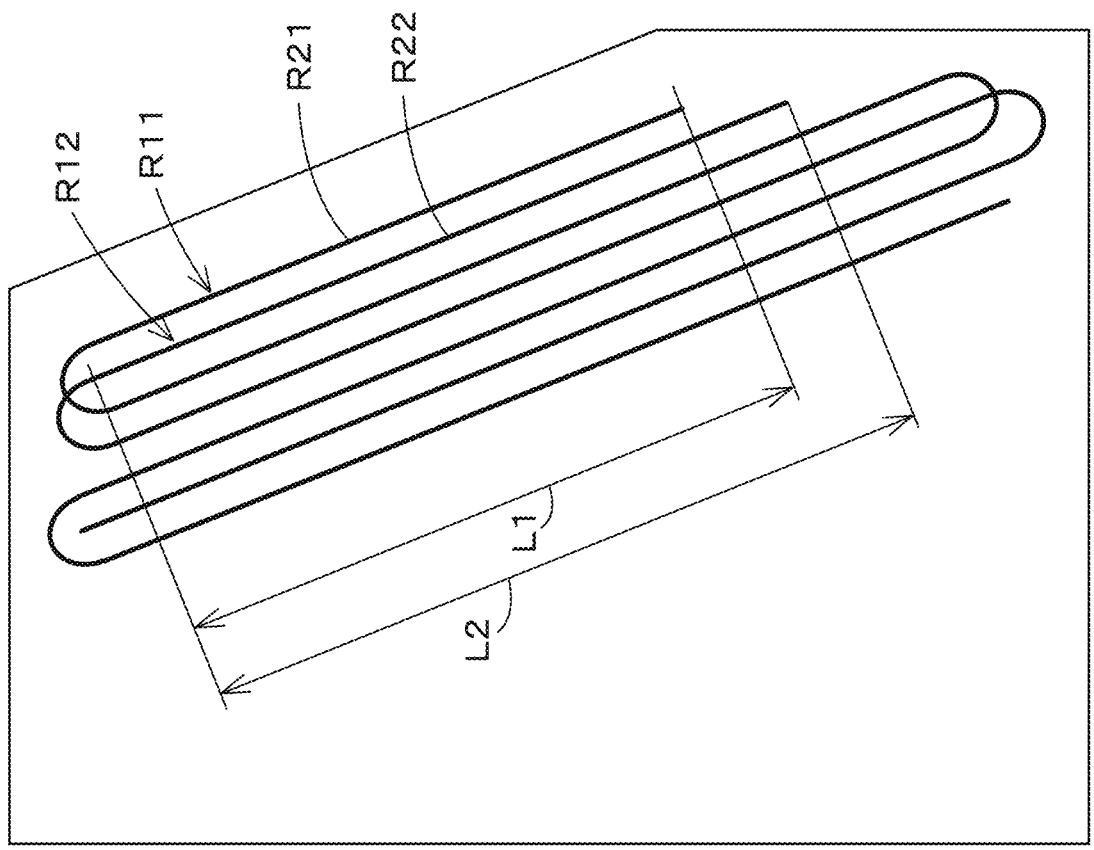
FIG. 8 is an explanation view explaining traveling when a scheduled traveling route is set in an agricultural field having a trapezoid shape according to a preferred embodiment of the present invention.

As shown in FIG. 8, when the agricultural field is trapezoidal, the length L1 of the straight portion R21 of the first scheduled route R11 is different from the length L2 of the straight portion R22 of the second scheduled route R12. Thus, in the straight portions R21 and R22, the traveling distances of the first virtual traveling body 1A and the second virtual traveling body 1B are respectively different between the turnings. In such a case, the inter-vehicle distance between the first virtual traveling body 1A and the second virtual traveling body 1B gradually decreases, and finally both the first virtual traveling body 1A and the second virtual traveling body 1B may come too close. For example, in the case where the preceding first virtual traveling body 1A is manned (manually operated) and the second virtual traveling body 1B automatically follows the first virtual traveling body 1A, or in the case where both of the first virtual traveling body 1A and the second virtual traveling body 1B are automatically driven, a situation is capable of showing in advance a case in which at least one of the first virtual traveling body 1A and the second virtual traveling body 1B activates an obstacle detector sensor to stop.

The agriculture support device 90 includes a correction permission portion 140. The correction permission portion 140 includes electric and electronic components provided in the agriculture support device 90, computer programs stored in the agriculture support device 90, or the like. In response to a request from the external terminal 15, the correction permission portion 140 permits the correction of the first scheduled route R11 and the second scheduled route R12 set by the traveling creator portion 130.

For example, as shown in FIG. 7, when the edit (correction) button 141 or the return button 142 is selected by the external terminal 15 on the simulation screen M5, the correction permission portion 140 determines that the correction of the first scheduled route R11 and the second scheduled route R12 has been requested, and then permits the correction. When the correction permission portion 140 permits the correction, the external terminal 15 displays the creating screen M1. When the creating screen M1 is displayed due to the permission of the correction by the correction permission portion 140, the traveling creator portion 130 displays, in the route creating area M12, the first scheduled route R11 and the second scheduled route R12 immediately before the simulation button 136 is selected. In this manner, the first scheduled route R11 and the second scheduled route R12 before performing the simulation are displayed on the creating screen M1, and thereby at least the first scheduled route R11 and the second scheduled route R12 set by the traveling creator portion 130 can be corrected.

When the creation of the work plan by the work creator portion 91 and the creation of the scheduled traveling route by the traveling creator portion 130 are completed (when the registration button 143 is selected after the necessary items are inputted on the creating screen M1), the plan management information is assigned to the work plan (a agricultural work, a model number of an agricultural machine, a model, a name, a work date, and the like as shown in FIG. 9A, and then the work plan is stored in the work plan storage portion. 92 together with the plan management information. In addition, as shown in FIG. 9B, the route management information is assigned to the route information (a position of the scheduled traveling route, the traveling information, and the like) on the scheduled traveling route, and the route information is stored in the traveling information storage portion 131 together with the route management information.

The agriculture support device 90 includes a plan linkage portion 145. The plan coordination unit 145 includes electric and electronic components provided in the agriculture support device 90, computer programs stored in the agriculture support device 90, or the like. The plan linkage portion 145 associates the work plan created by the work creator portion 91 with the scheduled traveling route created by the traveling creator portion 130. In particular, when the registration button 143 on the creating screen M1 is selected, the plan linkage portion 145 issues the linkage management information associating the plan management information assigned to the work plan and the route management information assigned to the route information, and thereby associates the work plan created on the creating screen M1 with the route management information. By issuing the linkage management information, the plan linkage portion 145 associates the item of the agricultural work inputted to the work inputting portion 101 with the scheduled traveling route inputted to the route inputting portion 106.

As described above, by associating the work plan with the scheduled traveling route, it is possible to manage not only the contents of agricultural work to be performed on the field but also the scheduled traveling route that is the procedure of the agricultural work. In the preferred embodiment described above, the plan management information is issued for the work plan, the route management information is issued for the route information, and the linkage management information for associating the information is issued. However, the work plan and the route information may be stored in association with each other in a database or the like in which the work plan storage portion 92 and the traveling information storage portion 131 are integrated.

The agriculture support device 90 includes a communicator portion 95. The communicator portion 95 includes electrical and electronic components provided in the agriculture support device 90, computer programs stored in the agriculture support device 90, or the like. The communicator portion 95 transmits the work plan and the route information to an agricultural machine such as the tractor 1.

For example, when the communication device 60A of the tractor 1 requests to transmit the work plan and the route information, or when the external terminal 15B capable of communicating with the tractor 1 requests to transmit the work plan and the route information capable of communicating with the tractor 1, the communicator portion 95 transmits the work plan and the route information to the communication device 60A or the terminal 15B. When the work plan and the route information are transmitted to the terminal 15B, the terminal 15B transfers the work plan and the route information to the input/output device 63 of the tractor 1 through the electronic storage medium.

The display device 80 includes a plan acquiring portion and a display portion 82. The plan acquiring portion 81 includes electric and electronic components provided on the display device 80, computer programs stored in the display device 80, or the like. The plan acquiring portion 81 acquires the work plan and the route information transmitted from the communicator portion 95 of the agriculture support device 90. For example, the plan acquiring portion 81 instructs the communication device 60A of the tractor 1 to request the agriculture support device 90 to acquire the work plan and the route information, and when the communication device 60A receives the work plan and the route information, the plan acquiring portion 81 fetches the work plan and route information received above. Alternatively, when the work plan and the route information are inputted to the input/output device 63 through the terminal 15B, the plan acquiring portion 81 takes in the work plan and the route information inputted to the input/output device 63. The display portion 82 includes a liquid crystal panel, a monitor, or the like.

Figure 10:
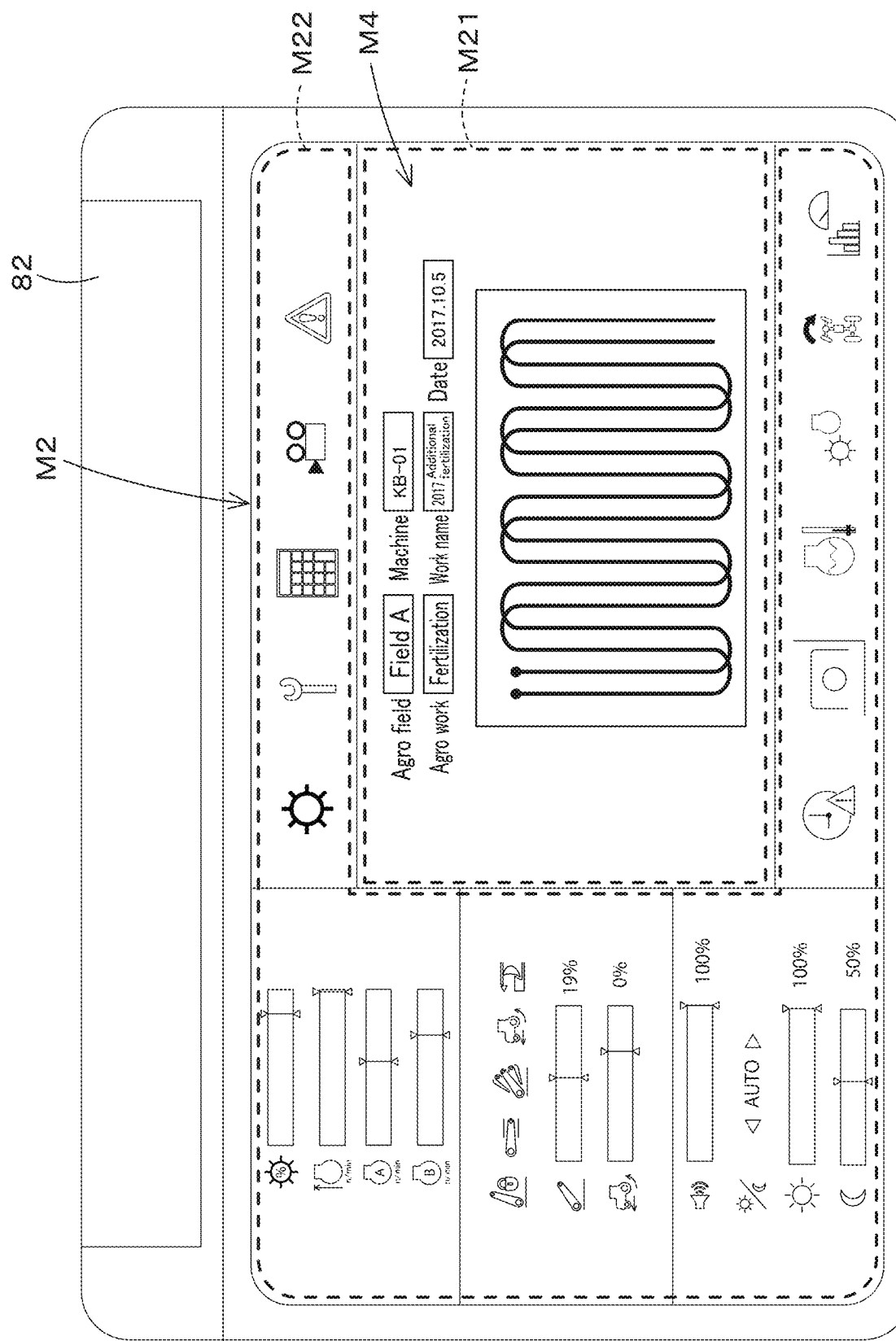
FIG. 10 is a view illustrating an example of a work plan screen M3 displayed on a display portion of the display device according to a preferred embodiment of the present invention.

As shown in FIG. 10, when a predetermined operation is performed, the display device 80 displays a screen M2 on the display portion 82. The screen M2 is divided at least into a first area M21 and a second area M22. The first area M21 is an area for displaying at least outside information (external information) acquired by the tractor 1. The second area M22 is an area where at least information (internal information) inside the tractor 1 can be displayed.

When acquiring the work plan and the route information, the display device 80 displays a list of the work plan and the route information as the external information, and when a predetermined work plan is selected, the display device 80 displays the work plan screen M3 in the first area M21, the work plan screen M3 representing the work plan and the route information selected above.

In the case where the work plan screen M3 is displayed in the first area M21, at least the agricultural work, the model number of the agricultural machine (the working machine), the model, the name, the work date, the scheduled traveling route, and the like are displayed on the work plan screen M3.

Thus, the worker can operate the tractor 1 while watching the work content and the scheduled traveling route. When the tractor 1 is specified for performing the automatic traveling, the tractor 1 is capable of being automatically driven along the scheduled traveling route. In addition, even when the tractor 1 is not specified for performing the automatic traveling, the operator can manually travel while watching the scheduled traveling route.

In the case of the direct communication, the communication device 60A of the tractor 1 transmits, to the agriculture support device 90, any one of a work result stored in the control device 12 (a first work result), a work result stored in the communication device 60A (a second work result), and a work result stored in the display device 80 (a third work result). In the case of the indirect communication, the communication device 60A transmits, to the terminal 15B, any one of the first work result, the second work result, and the third work result. After receiving the work result, the terminal 15B transmits the received work result to the agricultural support device 90.

Upon reception of the work result, the agriculture support device 90 stores the received work result in the result storage portion 99 including a nonvolatile memory or the like. In this manner, the agricultural support device 90 is capable of acquiring the results of performing the agricultural work with the tractor 1.

The display controller portion 135 causes the external terminal 15 to display not only the virtual traveling state but also the actual traveling state generated when the tractor 1 actually travels on the scheduled traveling route.

Figure 11:
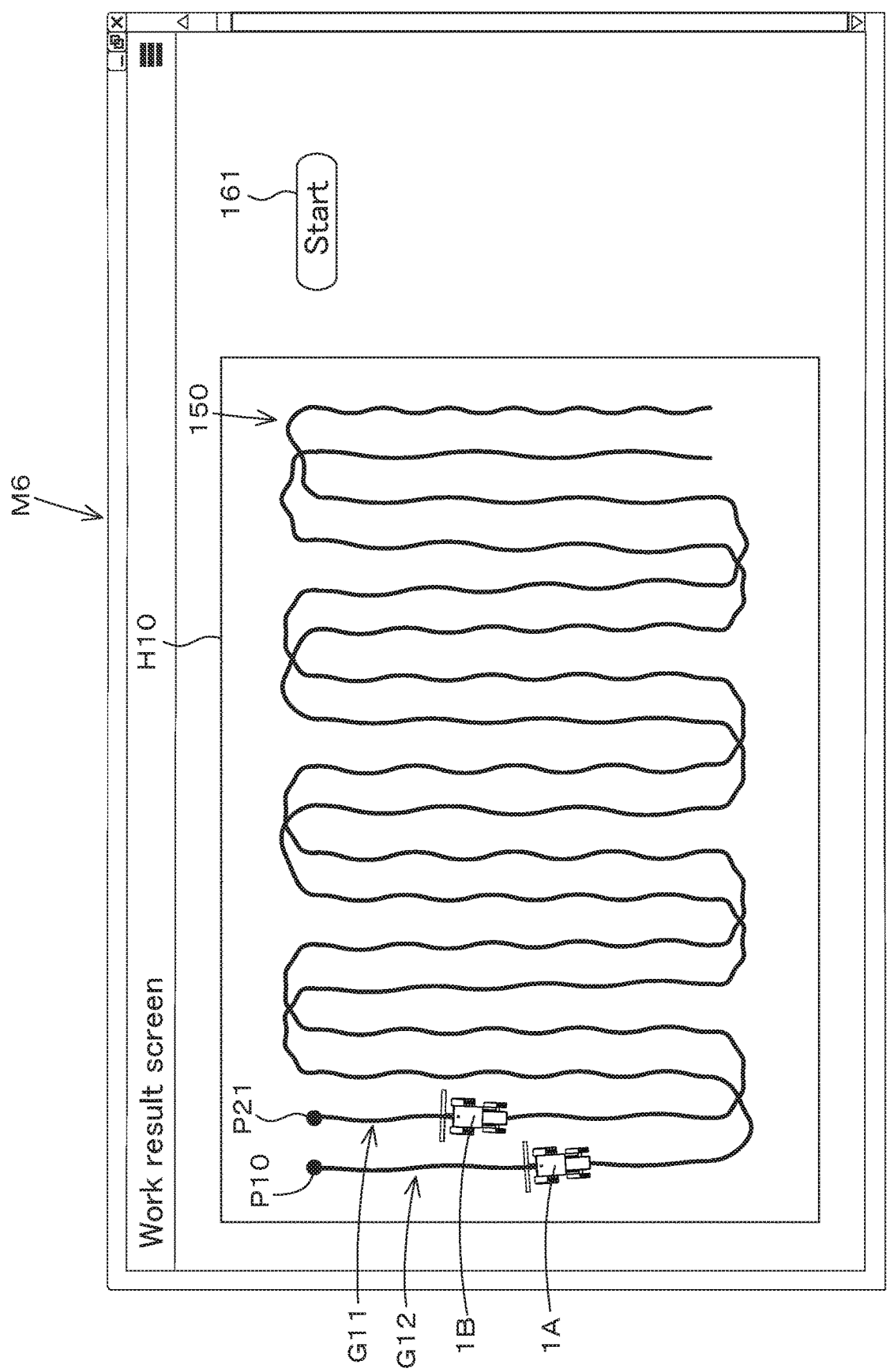
FIG. 11 is a view illustrating an example of an operation result screen M6 according to a preferred embodiment of the present invention.

When the external terminal 15 is connected to the agriculture support device 90 and a predetermined operation is performed, the display controller portion 135 displays a work result screen M6 on the external terminal 15 as shown in FIG. 11. The display controller portion 135 displays the contour H10 of the agricultural field on the field 150 of the work result screen M6. In addition, when two of the tractors traveled, the first result route G11 which is an actual traveling locus of the first tractor and the second result route G12 which is an actual traveling locus of the second tractor are displayed in two-dimensions.

In addition, the display controller portion 135 also displays, on the work result screen M6, the first virtual traveling body 1A including the tractor 1 traveling on the first result route G11 and the working device 2 and the second virtual traveling body 1B including the tractor 1 traveling on the second result route G12 and the working device 2. The display controller portion 135 displays the work results such as a work width and a vehicle speed on the work result screen M6.

When the start button 161 displayed on the work result screen M6 is selected, the movement of the first virtual traveling body 1A starts from the actual work start position P10, and the movement of the second virtual traveling body 1B starts from the work start position P20. The first virtual traveling body 1A moves along the first result route G11. The second virtual traveling body 1B moves along the second performance route G12. In the work result screen M6, the display controller portion 135 displays, as the result traveling state, the transition of the first virtual traveling body 1A and the second virtual traveling body 2B that have actually traveled on the first result route G11 and the second result route G12. Note that the moving speeds of the first virtual traveling body 1A and the second virtual traveling body 1B are speeds corresponding to the vehicle speeds indicated in the work results.

That is, on the work result screen M6, after the start button 161 is selected, it is possible to confirm the state where the first virtual traveling body 1A and the second virtual traveling body 1B respectively have traveled on the first result route G11 and the second result route G12. In this preferred embodiment, it is possible to confirm the actual traveling state where the first agricultural machine, which is an agricultural machine such as a tractor traveling on the first result route G11, and the second agricultural machine, which is an agricultural machine such as a tractor traveling on the second result route G12, have traveled in a coordinated manner. In the preferred embodiment mentioned above, the result traveling state of the tractor 1 is shown in a two-dimensional plan view, but may be shown in a three-dimensional manner as shown in FIG. 12.

In addition, the display controller portion 135 differs the color of position on which the first virtual traveling body 1A has already traveled from the color of position on which the first virtual traveling body 1A has not traveled yet on the field 150 on which the contour H10 of the agricultural field, the first result route G11, and the second result route G12 are displayed, thereby facilitating confirmation of the virtual traveling state. Similarly, the display controller portion 135 differs the color of position on which the second virtual traveling body 1B has already traveled from the color of position on which the second virtual traveling body 1B has not traveled yet on the field 139, thereby facilitating confirmation of the virtual traveling state.

According to the configuration mentioned above, at least one of the agriculture support system and the agriculture support device includes the traveling creator portion 130, the display controller portion 135, and the correction permission portion 140. In this configuration, it is possible to know the transition of traveling provided when the agricultural machine travels on the scheduled traveling route created by the traveling creator portion 130 through watching the virtual traveling state.

The display controller portion 135 displays, on the external terminal 15, the virtual traveling status and a result traveling status of the agricultural machine that has traveled on the scheduled traveling route. According to that configuration, it is possible to know the state of the case where the working machine actually travels on the scheduled traveling route created by the traveling creator portion 130 through watching the result traveling state.

The traveling creator portion 130 creates the scheduled traveling route including at least the first scheduled route R11 and the second scheduled route R12, and the display controller portion 135 displays, on the external terminal 15, the virtual traveling status of the agricultural machine to travel on each of the first scheduled route R11 and the second scheduled route R12. At least the first scheduled route R11 and the second scheduled route R12 can be created by the traveling creator portion 130, and the transition of traveling provided when the agricultural machine travels on the first scheduled route R11 and the second scheduled route R12 through watching the virtual traveling state.

The display controller portion 135 displays the virtual traveling status of a first agricultural machine and a second agricultural machine that travel in a coordinate manner, the first agricultural machine being the agricultural machine to travel on the first scheduled route R11, the second agricultural machine being the agricultural machine to travel on the second scheduled route R12. It is possible to know the transition of traveling provided when the first agricultural machine and the second agricultural machine respectively travel on the first scheduled route R11 and the second scheduled route R12.

The display controller portion 135 displays the virtual traveling status representing transition of a virtual traveling body traveling on the scheduled traveling route, the virtual traveling body including a tractor serving as the agricultural machine and a working device connected to the tractor. According to that configuration, it is possible to know the transition of traveling provided when the tractor is traveling.

At least one of the agriculture support system and the agriculture support device, includes the work creator portion 91 to create a work plan to be carried out by the agricultural machine, and the plan linkage portion 145 to link the work plan created by the work creator portion 91 to the scheduled traveling route created by the traveling creator portion 130.

According to that configuration, since the work plan and the scheduled traveling route of the agricultural machine can be associated with each other, it is possible to know the content to be performed in the agricultural field from the work plan, and to know, from the scheduled route, how to move the agricultural machine based on the work plan.

The work creator portion 91 displays, on the external terminal 15, a creating screen M1 including the work inputting portion 101 to which an agricultural work is inputted. The traveling creator portion 130 displays, on the creating screen M1 of the external terminal 15, the route inputting portion 106 to which a scheduled traveling route is inputted. And, the plan linkage portion 145 relates the agricultural work of the work inputting portion 101 to the scheduled traveling route inputted to the route inputting portion 106.

According to that configuration, since the work plan relating to the agricultural work and the scheduled traveling route of the agricultural machine can be associated with each other, it is possible to perform the agricultural work while knowing the agricultural work to be actually performed, the procedure of the agricultural work, that is, while knowing how to travel the agricultural machine.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agriculture support device comprising:
a server to execute one or more computer programs stored therein to function as:
a traveling creator to create a scheduled traveling route of an agricultural machine in an agricultural field;
a display controller to display, on an external terminal, a simulation screen which:
a contour of the agricultural field and the scheduled traveling route created by the traveling creator for the agricultural field are displayed in a predetermined screen field of the simulation screen;
a virtual traveling body representing the agricultural machine is displayed at a start position of the scheduled traveling route in the predetermined screen field of the simulation screen; and
a transition in which the virtual traveling body in the predetermined screen field of the simulation screen travels on the scheduled traveling route at a speed corresponding to a speed of the agricultural machine is displayed; and
a correction permitting controller to permit correction of the scheduled traveling route created by the traveling creator when the external terminal requests the correction.

2. The agriculture support device according to claim 1, wherein the display controller displays a work result screen and the simulation screen on the external terminal, the work result screen being a screen in which:
the contour of the agricultural field and a result route are displayed in a predetermined screen field of the work result screen, the result route being a route that the agricultural machine actually traveled during traveling in the agricultural field according to the scheduled traveling route;
the virtual traveling body is displayed at an actual start position of the result route in the predetermined screen field of the work result screen; and
a transition in which the virtual traveling body in the predetermined screen field of the work result screen travels on the result route at a speed corresponding to a vehicle speed indicated in a work result of the agricultural machine is displayed.

3. The agriculture support device according to claim 1, wherein
the traveling creator creates the scheduled traveling route including at least a first scheduled route and a second scheduled route; and
the display controller displays, on the external terminal, the simulation screen in which:
a first virtual traveling body representing a first agricultural machine which is the agricultural machine to travel on the first scheduled route is displayed at a start position of the first scheduled route in the predetermined screen field of the simulation screen;
a second virtual traveling body representing a second agricultural machine which is the agricultural machine to travel on the second scheduled route is displayed at a start position of the second scheduled route in the predetermined screen field of the simulation screen; and
when the first agricultural machine and the second agricultural machine travel in a coordinated manner, a transition in which the first virtual traveling body hi the predetermined screen field of the simulation screen travels on the first scheduled route at a speed corresponding to a speed of the first agricultural machine and a transition in which the second virtual traveling body in the predetermined screen field of the simulation screen travels on the second scheduled route at a speed corresponding to a speed of the second agricultural machine are displayed.

4. The agriculture support device according to claim 1, wherein the virtual traveling body includes a tractor defining the agricultural machine and a working device connected to the tractor.

5. The agriculture support device according to claim 1, wherein the server is configured to execute one or more computer programs stored therein to function as:
a work creator to create a work plan to be carried out by the agricultural machine; and
a plan linkage portion to link the work plan created by the work creator to the scheduled traveling route created by the traveling creator.

6. The agriculture support device according to claim 5, wherein
the work creator displays, on the external terminal, a creating screen including a work inputting portion to which an agricultural work is inputted;
the traveling creator displays, on the creating screen of the external terminal, a route inputting portion to which a scheduled traveling route is inputted; and
the plan linkage portion relates the agricultural work of the work inputting portion to the scheduled traveling route inputted to the route inputting portion.

7. An agriculture support system comprising:
an external terminal; and
an agriculture support device including a server to execute one or more computer programs stored therein to function as:
a traveling creator to create a scheduled traveling route of an agricultural machine in an agricultural field;
a display controller to display, on the external terminal, a simulation screen in which;
a contour of the agricultural field and the scheduled traveling route created by the traveling creator for the agricultural field are displayed in a predetermined screen field of the simulation screen;
a virtual traveling body representing the agricultural machine is displayed at a start position of the scheduled traveling route in the predetermined screen field of the simulation screen; and
a transition in which the virtual traveling body in the predetermined screen field of the simulation screen travels on the scheduled traveling route at a speed corresponding to a speed of the agricultural machine is displayed; and
a correction permitting controller to permit correction of the scheduled traveling route created by the traveling creator when the external terminal requests the correction.

8. The agriculture support system according to claim 7, wherein the display controller displays a work result screen and the simulation screen on the external terminal, the work result screen being a screen in which:
the contour of the agricultural field and a result route are displayed in a predetermined screen field of the work result screen, the result route being a route that the agricultural machine actually traveled during traveling in the agricultural field according to the scheduled traveling route;

the virtual traveling body is displayed at an actual start position of the result route in the predetermined screen field of the work result screen; and a transition in which the virtual traveling body in the predetermined screen field of the work result screen travels on the result route at a speed corresponding to a vehicle speed indicated in a work result of the agricultural machine is displayed.

9. The agriculture support system according to claim 7, wherein the traveling creator creates the scheduled traveling route including at least a first scheduled route and a second scheduled route; and the display controller displays, on the external terminal, the simulation screen in which:

a first virtual traveling body representing a first agricultural machine which is the agricultural machine to travel on the first scheduled route is displayed at a start position of the first scheduled route in the predetermined screen field of the simulation screen;

a second virtual traveling body representing a second agricultural machine which is the agricultural machine to travel on the second scheduled route is displayed at a start position of the second scheduled route in the predetermined screen field of the simulation screen; and when the first agricultural machine and the second agricultural machine travel in a coordinated manner, a transition in which the first virtual traveling body hi the predetermined screen field of the simulation screen travels on the first scheduled route at a speed corresponding to a speed of the first agricultural machine and a transition in which the second virtual traveling body in the predetermined screen field of the simulation screen travels on the second scheduled route at a speed corresponding to a speed of the second agricultural machine are displayed.

10. The agriculture support system according to claim 7, wherein the virtual traveling body includes a tractor defining the agricultural machine and a working device connected to the tractor.

11. The agriculture support system according to claim 7, wherein the server is configured to execute one or more computer programs stored therein to function as:

a work creator to create a work plan to be carried out by the agricultural machine; and a plan linkage portion to link the work plan created by the work creator to the scheduled traveling route created by the traveling creator.

12. The agriculture support system according to claim 11, wherein the work creator displays, on the external terminal, a creating screen including a work inputting portion to which an agricultural work is inputted;

the traveling creator displays, on the creating screen of the external terminal, a route inputting portion to which a scheduled traveling route is inputted; and the plan linkage portion relates the agricultural work of the work inputting portion to the scheduled traveling route inputted to the route inputting portion.

* * * * *